United States Patent [19]
Ayerst et al.

[11] Patent Number: 5,521,926
[45] Date of Patent: May 28, 1996

[54] METHOD AND APPARATUS FOR IMPROVED MESSAGE RECEPTION AT A FIXED SYSTEM RECEIVER

[75] Inventors: Douglas I. Ayerst, Delray Beach; Brian J. Budnik, Schaumburg, both of Ill.; Malik J. Khan, Lake Worth, Fla.

[73] Assignee: Motorola, Inc., Schaumburg, Ill.

[21] Appl. No.: 283,369

[22] Filed: Aug. 1, 1994

[51] Int. Cl.[6] ........................................ H04J 3/06
[52] U.S. Cl. .................. 370/953; 370/100.1; 455/51.1; 375/356
[58] Field of Search .................. 370/95.1, 95.2, 370/95.3, 94.1, 110.1, 94.2, 85.2, 85.7, 85.8, 85.1, 100.1; 455/33.1, 34.1, 34.2, 54.1, 54.2, 51.1; 340/825.07, 825.08; 375/356

[56] References Cited

U.S. PATENT DOCUMENTS 4,918,437  4/1990  Jasinski et al. .................. 370/825.94
5,377,192  12/1994  Goodings et al. .................. 370/95.3

Primary Examiner—Benedict V. Safourek
Assistant Examiner—Ajit Patel
Attorney, Agent, or Firm—James A. Lamb

[57] ABSTRACT

A fixed system receiver (107), which includes a forward receiver (305), a reverse receiver (310), and a response timer (215), is for use in a radio communication system (100) having a forward radio channel and a reverse radio channel. A command is transmitted in a forward channel radio signal to a selective call transceiver. The forward receiver (305) is for receiving, demodulating, and decoding the command. The reverse receiver (310) is for receiving and demodulating the reverse channel radio signal. The response timer (215), which is coupled to the forward receiver (305) and the reverse receiver (310), is for determining a response period beginning substantially at a scheduled response time included in the command and having a duration which is substantially a designated length of the data unit included in the command, and for generating a control signal which enables the reverse receiver (310) during the response period.

21 Claims, 9 Drawing Sheets

5,521,926

METHOD AND APPARATUS FOR IMPROVED MESSAGE RECEPTION AT A FIXED SYSTEM RECEIVER

FIELD OF THE INVENTION

This invention relates in general to a selective call radio communication system providing a received message response and in particular to a message response in a selective call radio communication system having fixed system receivers and scheduled response messages.

BACKGROUND OF THE INVENTION

In a selective call radio communication system having a forward channel for transmitting digital messages to selective call transceivers from a system controller and receiving digital messages and responses at the system controller from the selective call transceivers in one or more reverse channels, a known means of organizing the responses in the reverse channels is to schedule the responses, using information transmitted in the forward channel to the selective call transceivers to perform the scheduling. This is a general approach used in a variety of radio systems.

A first example of such a system is a single frequency half duplex system having one or more transmitters for transmitting the digital messages at a radio carrier frequency from the system controller and one or more fixed receivers for receiving the messages and responses from the selective call transceivers on the same radio carrier frequency. The transmissions from the system controller are typically suspended to allow responses from the selective call transceivers. The responses may be transmitted from the selective call transceivers using a random or semi-random method, or they may be organized by information transmitted from the system controller. The organized method works particularly well in a system having a large percentage of acknowledgments or other demand type of responses. The demand type of responses can be scheduled during the transmission from the system controller which generates the demand responses. The selective call transceivers can include in random responses information indicating to the system controller that additional messages are being held within the selective call transceivers, awaiting scheduled transmission to the system controller. With this information, the system controller can schedule the held messages for transmission on the reverse channel.

A second example of a system using scheduled responses in a reverse channel is a duplex system having one or more transmitters for transmitting the digital messages at a radio carrier frequency from the system controller and one or more fixed receivers for receiving the messages and responses at a second radio carrier frequency from the selective call transceivers. In this system, the transmissions from the system controller do not need to be stopped to allow responses from the selective call transceivers. However, the responses may be organized, as in the case of the first example, by information transmitted from the system controller.

In the case of both examples, some generic parameters of the scheduled reverse channel transmissions are used by the fixed receivers for recovering the reverse channel information from the transmissions made by the selective call transceivers. For example, predetermination of the modulation and bit rate to be received in the reverse channel is typically needed by the fixed receivers to properly recover the reverse channel information. Also, in a half duplex system, the fixed receiver may need a predetermination of when the radio frequency is being used for the reverse channel, to avoid misinterpreting information that is actually forward channel information as reverse channel information. The message and response information communicated within systems such as given in the examples described above may be transmitted in packets of one or more predetermined fixed lengths. A first packet of a group of packets, or a single packet, transmitted by a selective call transceiver typically includes a packet synchronization portion at the start of the packet, which provides bit synchronization and identifies the beginning of a second portion of the packet consisting of data words. Packets in a group of packets, which are not the first packet of the group, may derive their bit and word synchronization from the first packet in the group and therefore not include a synchronization portion.

Using the predetermined modulation and reverse channel timing information, a fixed receiver can recover most of such packets transmitted in the reverse channel by the selective call transceivers, when the packets are received within radio signals having a signal strength above a minimum threshold. However, there are circumstances which may prevent the fixed receivers from recovering some of these radio packets. These circumstances arise when the fixed receiver's synchronization pattern detector is falsed by noise, resulting in a false detection of a synchronization pattern, further resulting in a false indication of the beginning of the word portion of a packet. When this happens, the fixed receiver can miss the decoding of the synchronization pattern and code words for a transmitted packet because the fixed receiver is incorrectly processing data symbols from the transmitted packet which are out of word synchronization sequence, due to the false detection of a synchronization pattern prior to the actual start of the transmitted packet. As a result of such false synchronization detections, packets and groups of packets are not decoded that otherwise could be, and the message throughput and message sensitivity performance characteristics are therefore not as good as they otherwise could be.

Thus, what is needed is a method to improve the message sensitivity and message throughput performance characteristics in digital radio communication systems having a forward and reverse channel and using forward channel scheduling for messages and responses transmitted in the reverse channel by one or more selective call transceivers

SUMMARY OF THE INVENTION

Accordingly, in a first aspect of the present invention, a method is used in a fixed system receiver for improving response reception in a radio communication system having a forward radio channel and a reverse radio channel. A command is transmitted in a forward channel radio signal by a fixed transmitter to a selective call transceiver. The fixed system receiver includes a forward receiver and a reverse receiver. The method includes the steps of receiving, demodulating, and decoding the command, determining a response period, and receiving and demodulating the reverse channel radio signal.

In the step of receiving, demodulating, and decoding the command, which is performed in the forward receiver, the command, which includes an address of a selective call transceiver and a scheduled response time at which the selective call transceiver transmits a reverse channel radio signal including a data unit is received, demodulated, and decoded. The command includes a designated length of the data unit. In the step of determining a response period, a response period is determined which begins substantially at the scheduled response time and has a duration which is substantially the designated length of the data unit. In the step of receiving and demodulating the reverse channel radio signal, the reverse channel radio signal transmitted by the selective call transceiver during the response period is received and demodulated.

Accordingly, in a second aspect of the present invention, a fixed system receiver is for use in a radio communication system having a forward radio channel and a reverse radio channel. A command is transmitted in a forward channel radio signal by a fixed transmitter to a selective call transceiver. The fixed system receiver includes a forward receiver, a reverse receiver, and a response timer.

The forward receiver is for receiving, demodulating, and decoding the command included in the forward channel radio signal. The command includes an address of a selective call transceiver and a scheduled response time at which the selective call transceiver transmits a reverse channel radio signal including a data unit. The command includes a designated length of the data unit.

The reverse receiver is for receiving and demodulating the reverse channel radio signal.

The response timer, which is coupled to the forward receiver and the reverse receiver, is for determining a response period beginning substantially at the scheduled response time and having a duration which is substantially the designated length of the data unit, and for generating a control signal which enables the reverse receiver during the response period.

Accordingly, in a third aspect of the present invention, a fixed system receiver is for use in a radio communication system having a forward radio channel and a reverse radio channel. A command is transmitted in a forward channel radio signal by a fixed transmitter to a selective call transceiver. The fixed system receiver includes a combined receiver, a response timer, and a system controller.

The combined receiver is for receiving, demodulating, and decoding the command. The command is included in the forward channel radio signal having a first radio carrier frequency. The command includes an address of a selective call transceiver and a scheduled response time at which the selective call transceiver transmits a reverse channel radio signal having the first radio carrier frequency. The reverse channel radio signal includes a data unit. The command includes a designated length of the data unit. The combined receiver is also for receiving and demodulating the reverse channel radio signal.

The response timer, which is coupled to the combined receiver, is for determining a response period beginning substantially at the scheduled response time and having a duration which is substantially the designated length of the data unit. The response timer is also for generating a control signal which enables the combined receiver during the response period and disables the combined receiver at times which are not the response period.

The system controller, which is coupled to the combined receiver, is for decoding a received data unit from the demodulated reverse channel radio signal received at the scheduled response time. The system controller is also for routing the received data unit to a system controller when the received data unit has the designated length of the data unit and when the received data unit includes a transceiver address which matches the address of the selective call transceiver, and is for terminating processing of the received data unit when the received data unit does not have the designated length of the data unit or when the received data unit does not include a transceiver address which matches the address of the selective call transceiver.

The forward radio channel has a plurality of forward channel frame boundaries and a reverse channel frame boundary, which is relative to one of the plurality of forward channel frame boundaries. The reverse channel frame boundary is included in the command. The scheduled response time is relative to the reverse channel frame boundary.

DETAILED DESCRIPTION OF THE INVENTION

Figure 1:
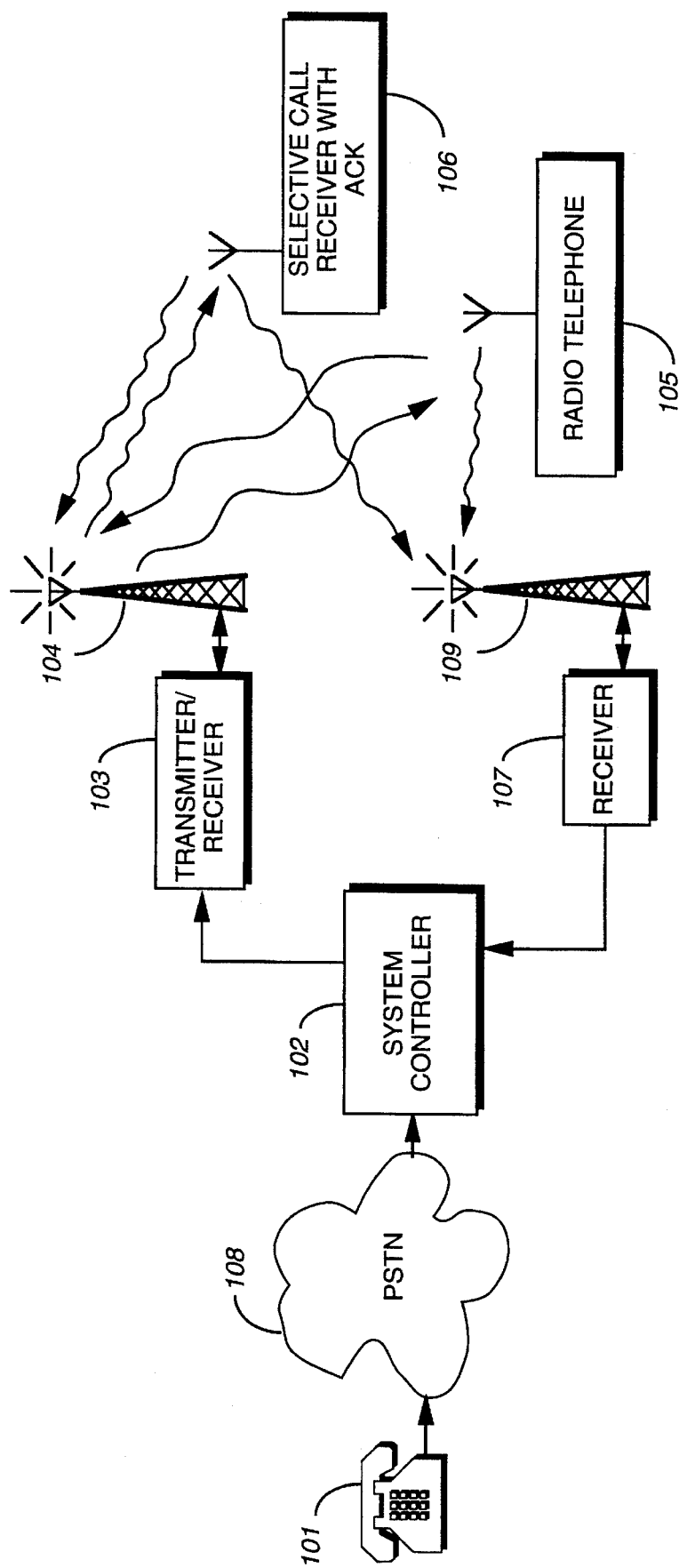
FIG. 1 is an electrical block diagram of a radio communication system, in accordance with the preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101, connected by a conventional public switched telephone network (PSTN) 108 to a system controller 102. The system controller 102 oversees the operation of at least one radio frequency transmitter/receiver 103 and at least one fixed system receiver 107, and encodes and decodes inbound and outbound telephone addresses into formats that are compatible with land line message switch computers and personal radio telephone addressing requirements, such as cellular message protocols. The system controller 102 also functions to encode paging messages for transmission by the radio frequency transmitter/receiver 103. Telephony signals and data messages are transmitted from and received by a conventional antenna 104 coupled to the radio frequency transmitter/receiver 103, and are received by a conventional antenna 109 coupled to the fixed system receiver 107, which by a unique design recovers the data messages with improved throughput and reduced falsing. The telephony signals are transmitted to and received from a conventional personal radio telephone 105. The radio frequency transmitter/receiver 103 is also used to transmit data paging messages to a portable receiving device 106. Acknowledgments and data messages are transmitted by the radio telephone 105 and the portable receiving device 106, received by the antennas 104 and 109, and coupled to the system controller 102.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, fixed system receivers 107, and conventional antennas 109, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 coupled to a conventional radio frequency transmitter.

It will be appreciated that other selective call radio terminal devices (not shown in FIG. 1), such as conventional mobile cellular telephones, mobile radio data terminals, mobile cellular telephones having attached data terminals, or mobile radios (trunked and non-trunked) having data terminals attached, are also able to be used in the radio communication system 100. In the following description, the term "selective call transceiver" will be used to refer to the personal radio telephone 105, or the portable transmitting/ receiving device 106, a mobile cellular telephone, a mobile radio data terminal, a mobile cellular telephone having an attached data terminal, or a mobile radio (conventional or trunked) having a data terminal attached. Each of the selective call transceivers assigned for use in the radio communication system 100 has an address assigned thereto which is a unique selective call address. The address enables the transmission of a message from the system controller 102 only to the addressed selective call transceiver, and identifies messages and responses received at the system controller 102 from the selective call transceiver. Furthermore, each of one or more of the selective call transceivers also has a unique telephone number assigned thereto, the telephone number being unique within the PSTN 108. A list of the assigned selective call addresses and correlated telephone numbers for the selective call transceivers is stored in the system controller 102 in the form of a subscriber data base.

The system controller 102 queues data and stored voice messages for transmission to the selective call transceivers, connects telephone calls for transmission to the selective call transceivers, and receives acknowledgments, data responses, data messages, and telephone calls from the selective call transceivers. The subscriber data base in the system controller 102 stores information relevant to each subscriber's selective call transceiver, including a correlation between the unique address assigned to each selective call transceiver and the telephone number used within the PSTN 108 to route messages and telephone calls to each selective call transceiver, as well as other subscriber determined preferences, such as hours during which messages are to be held back from delivery to the selective call transceiver.

The system controller 102 schedules transmissions of messages and acknowledgments from the selective call transceivers. These transmissions include demand type transmissions from the selective call transceivers, such as acknowledgments to messages which have been transmitted by the system controller 102 and responses to messages such as status inquiries transmitted from the system controller 102. The scheduled transmissions can also include non-demand transmissions from the selective call transceivers, such as messages being held by the selective call transceivers, about which the selective call transceivers have informed the system controller 102 within a previous message or acknowledgment transmitted to the system controller 102 by the selective call transceiver. The use of reverse channel scheduling under certain circumstances improves the throughput of the reverse channel in comparison to that achievable for an unscheduled, random input reverse channel organization scheme such as that used in an ALOHA system, well known to one of ordinary skill in the art. As will be described in more detail below, a scheduled reverse channel may be a portion of the total time available in a half duplex single frequency radio channel (a single radio carrier frequency which is time shared for both forward and reverse channels). Alternatively, the scheduled reverse channel may be some portion of the time available, or all of the time available, in a second radio carrier frequency which is different than the forward channel radio frequency. Methods for identifying scheduled times will be described below.

The system controller 102 is preferably a model E09PED0552 PageBridge® paging terminal manufactured by Motorola, Inc., of Schaumburg Ill., modified with special firmware elements in accordance with the preferred embodiments of the present invention, as described herein. The system controller alternatively could be implemented using a MPS2000® paging terminal manufactured by Motorola, Incorporated of Schaumburg, Ill. The subscriber data base may alternatively be implemented as magnetic or optical disk memory, which may alternatively be external to the system controller 102.

Figure 2:
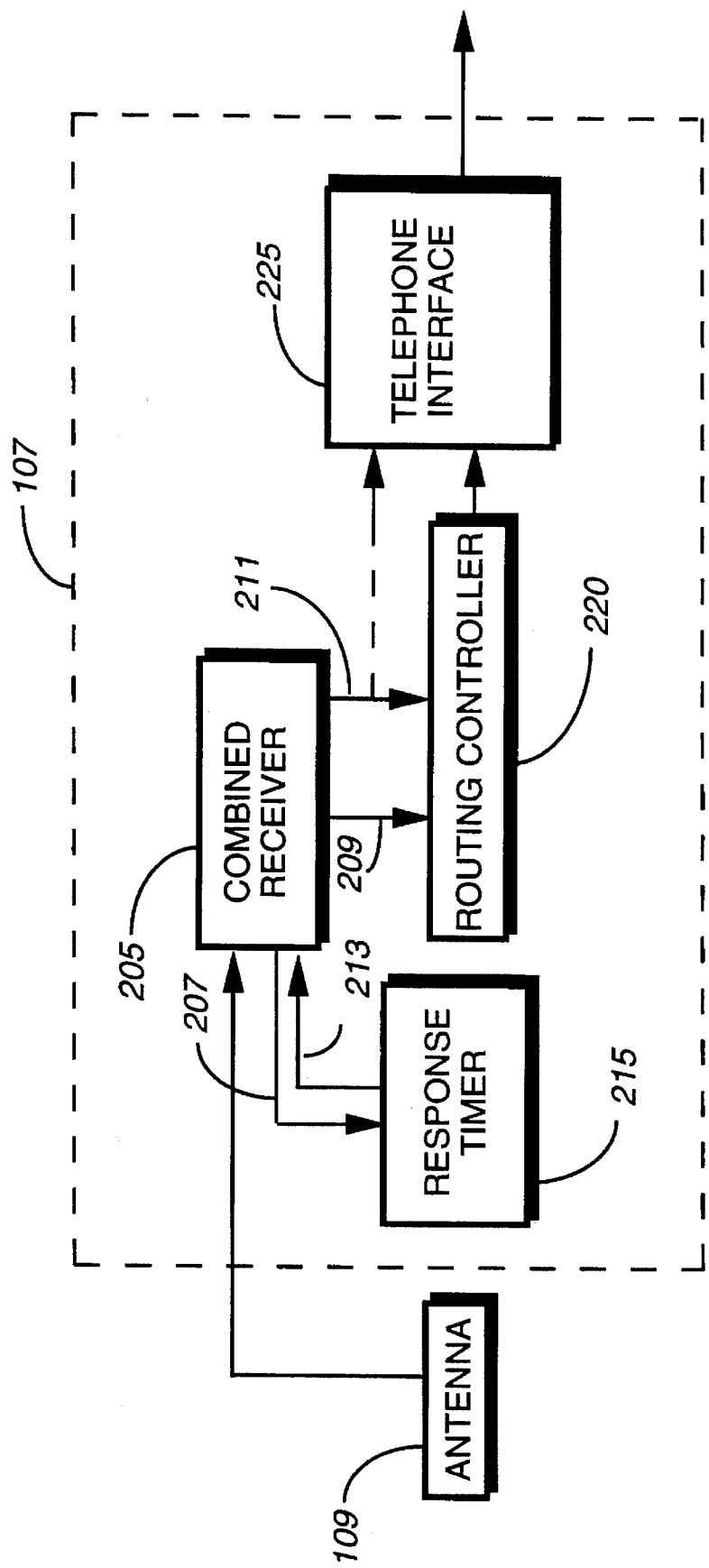
FIG. 2 is an electrical block diagram of a fixed receiver, in accordance with the preferred and first alternative embodiments of the present invention.

Referring to FIG. 2, an electrical block diagram of the fixed receiver 107 is shown, in accordance with a preferred embodiment of the present invention. The fixed receiver 107 comprises a combined receiver 205, which is a radio frequency receiver operating at a first radio carrier frequency for receiving forward and reverse radio channel signals, as will be described more fully below, a response timer 215, a telephone interface 225, a routing controller 220, and the antenna 109. The antenna 109 is coupled to a first input of the combined receiver 205. A first output 207 of the combined receiver 205 is coupled to the response timer 215 and a second output 209 of the combined receiver 205 is coupled to the routing controller 220. A control signal is generated by the response timer 215 and is coupled a second input 213 of the combined receiver 205. An output 211 of the combined receiver 205 is coupled to the routing controller 220. The routing controller 220 has an output coupled to the telephone interface 225. The telephone interface 225 has an output which is coupled to the system controller 102, through a private network or the PSTN 108. The fixed system receiver 107 includes unique functions which disable reception to reduce falsing and which test responses received from the selective call transceivers to improve throughput, as will be more fully described below.

Referring again to FIG. 2, in a first alternative embodiment of the present invention, the routing controller 220 is omitted and the output 211 of the combined receiver 205 is coupled directly to the telephone interface 225. The second output 209 of the combined receiver 205 is not used.

The fixed system receiver 107 in accordance with the preferred and first alternative embodiments of the present invention preferably comprises a Nucleus® model receiver manufactured by Motorola, Inc. of Schaumburg, Ill., with unique functions added to the standard model. The unique functions are provided by firmware routines developed in accordance with techniques well known to one of ordinary skill in the art.

The fixed system receiver 107, in accordance with the preferred and first alternative embodiment of the present invention, operates in a first type or a second type of radio communication system 100. In the first type of radio communication system 100, a first radio carrier frequency is time shared by a forward channel, which is for transmitting information from the transmitter/receivers 103 in a forward channel radio signal to one or more identified selective call transceivers, and a reverse channel, which is for transmitting scheduled responses from the identified selective call transceivers in reverse channel radio signals to the transmitter/receivers 103. The antenna 109 intercepts the forward channel radio signal, which includes telephony signals, digital messages, and commands. The combined receiver 205 receives, demodulates and decodes the commands included in the forward channel radio signal. From information included in the commands, the response timer 215 generates the control signal, which enables and disables the combined receiver 205 during the reverse channel time of the first radio frequency. When the combined receiver 205 is enabled by the control signal, the combined receiver 205 receives and demodulates radio signals which contain scheduled responses transmitted by the selective call transceivers.

In the preferred embodiment of the present invention, the scheduled responses are coupled to the routing controller 220, wherein tests are performed on the scheduled responses. When tests results are successful, the scheduled responses are coupled to the telephone interface 225, wherein the scheduled responses are used to modulate signals, such as modem signals, which are transmitted to the system controller 102. When the tests are not successful, the scheduled responses are processed no further. In the first alternative embodiment of the present invention, the scheduled responses are not tested, and are coupled directly to the telephone interface 225. The scheduled responses include responses from the selective call transceivers such as message and/or acknowledgment information.

In the second type of radio communication system 100, the forward radio channel and reverse radio channel are at two different radio frequencies, and at least one of the transmitter/receivers 103 transmits the commands in two radio signals: a forward channel radio signal having a first radio carrier frequency which is a forward channel radio frequency and a reverse channel radio signal having a second radio carrier frequency which is a reverse channel radio frequency, although the forward and reverse transmissions of the commands are not necessarily simultaneous. Thus, in the radio communication system 100 of the first and second types, only one frequency need be received to recover the commands and the scheduled responses, which are used to generate the control signal and perform the tests of the responses, because the commands are transmitted at the same frequency as the scheduled responses.

Figure 3:
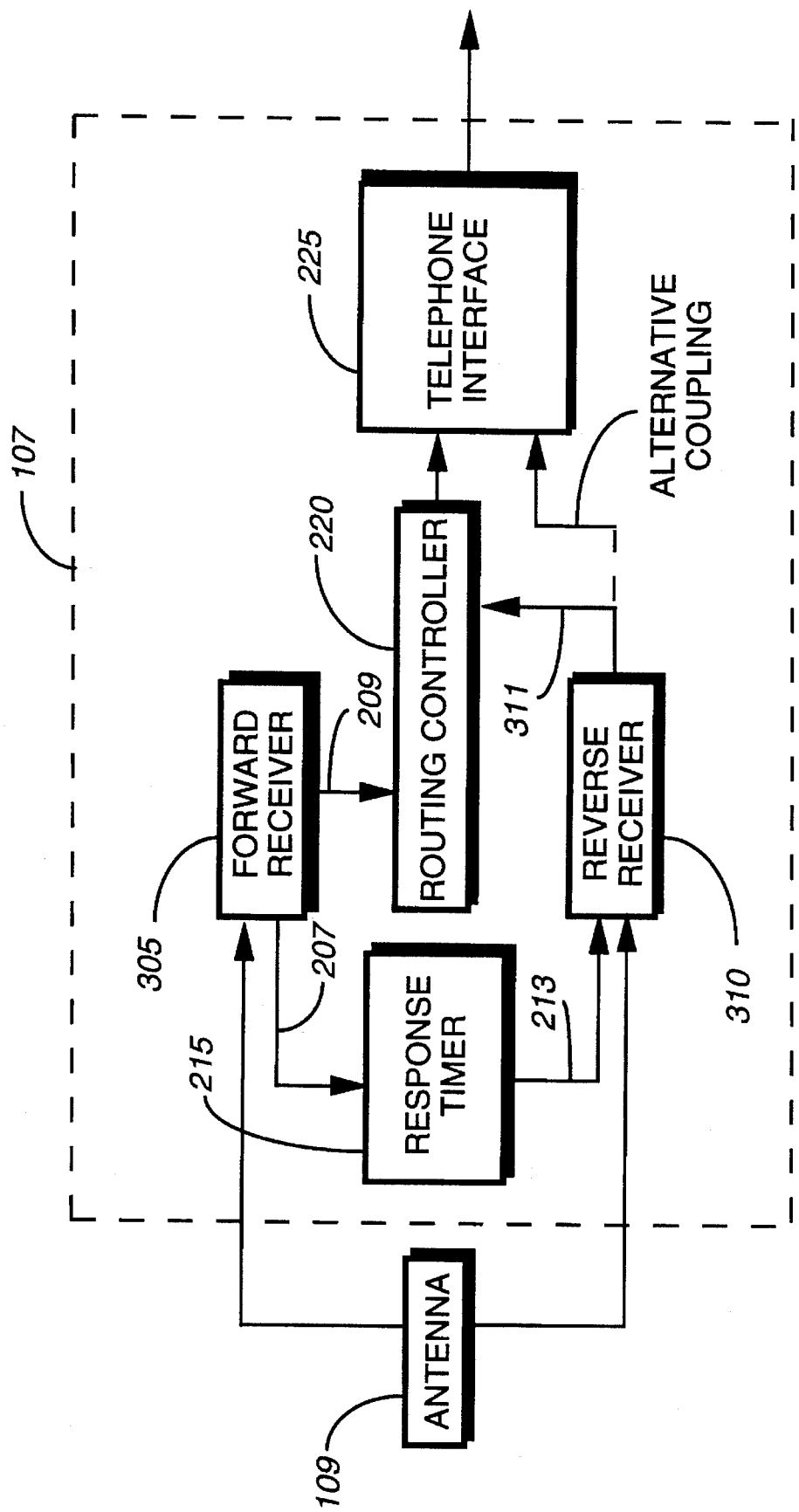
FIG. 3 is an electrical block diagram of a fixed system receiver 107, in accordance with second and third alternative embodiments of the present invention.

Referring to FIG. 3, a block diagram of the fixed system receiver 107 is shown in accordance with a second alternative embodiment of the present invention. The fixed system receiver 107 shown in FIG. 3 differs from the fixed system receiver 107 shown in FIG. 2 in that a separate forward receiver 305 and reverse receiver 310 perform the functions performed by the combined receiver 205 of the preferred embodiment of the present invention. A first output 207 of the forward receiver 305 is coupled to the response timer 215 and a second output 209 of the forward receiver 305 is coupled to the routing controller 220. A control signal is generated by the response timer 215 and is coupled to a second input 213 of the reverse receiver 310. An output 311 of the reverse receiver 310 is coupled to the routing controller 220. The routing controller 220 has an output coupled to the telephone interface 225. The telephone interface 225 has an output which is coupled to the system controller 102, through the private network or the PSTN 108.

Referring again to FIG. 3, in the fixed system receiver 107 in accordance with a third alternative embodiment of the present invention, the routing controller 220 is omitted and the output 311 of the reverse receiver 310 is coupled directly to the telephone interface 225. The second output of the forward receiver 305 is not used.

The fixed system receiver 107 in accordance with the second and third alternative embodiments of the present invention preferably comprises two Nucleus® model receivers manufactured by Motorola, Inc. of Schaumburg, Ill., with unique functions added to the standard model. The unique functions are provided by firmware routines developed in accordance with techniques well known to one of ordinary skill in the art.

The fixed system receiver 107, in accordance with the second alternative embodiment of the present invention, operates in a third type of radio communication system 100. In the third type of radio communication system 100, a forward channel radio frequency is used for transmitting information from the transmitter/receivers 103 in a forward channel radio signal to one or more identified selective call transceivers, and a reverse channel radio frequency, which is different than the forward channel radio frequency, is used for transmitting responses from the identified selective call receivers in a reverse channel radio signal to the transmitter/receivers 103. The antenna 109 intercepts the forward channel radio signal, which includes telephony signals, digital messages, and commands. The forward receiver 305 receives, demodulates and decodes the commands included in the forward channel radio signal. From information included in the commands, the response timer 215 generates the control signal, which enables and disables the reverse receiver 310. When the reverse receiver 310 is enabled by the control signal, the reverse receiver 310 receives and demodulates radio signals which contain scheduled responses transmitted by the identified selective call transceivers.

The scheduled responses are processed in the second and third alternative embodiments of the present invention, in an identical manner in which scheduled responses are processed, respectively, in the preferred embodiment and first alternative embodiment of the present invention, which are described more fully below.

Figure 4:
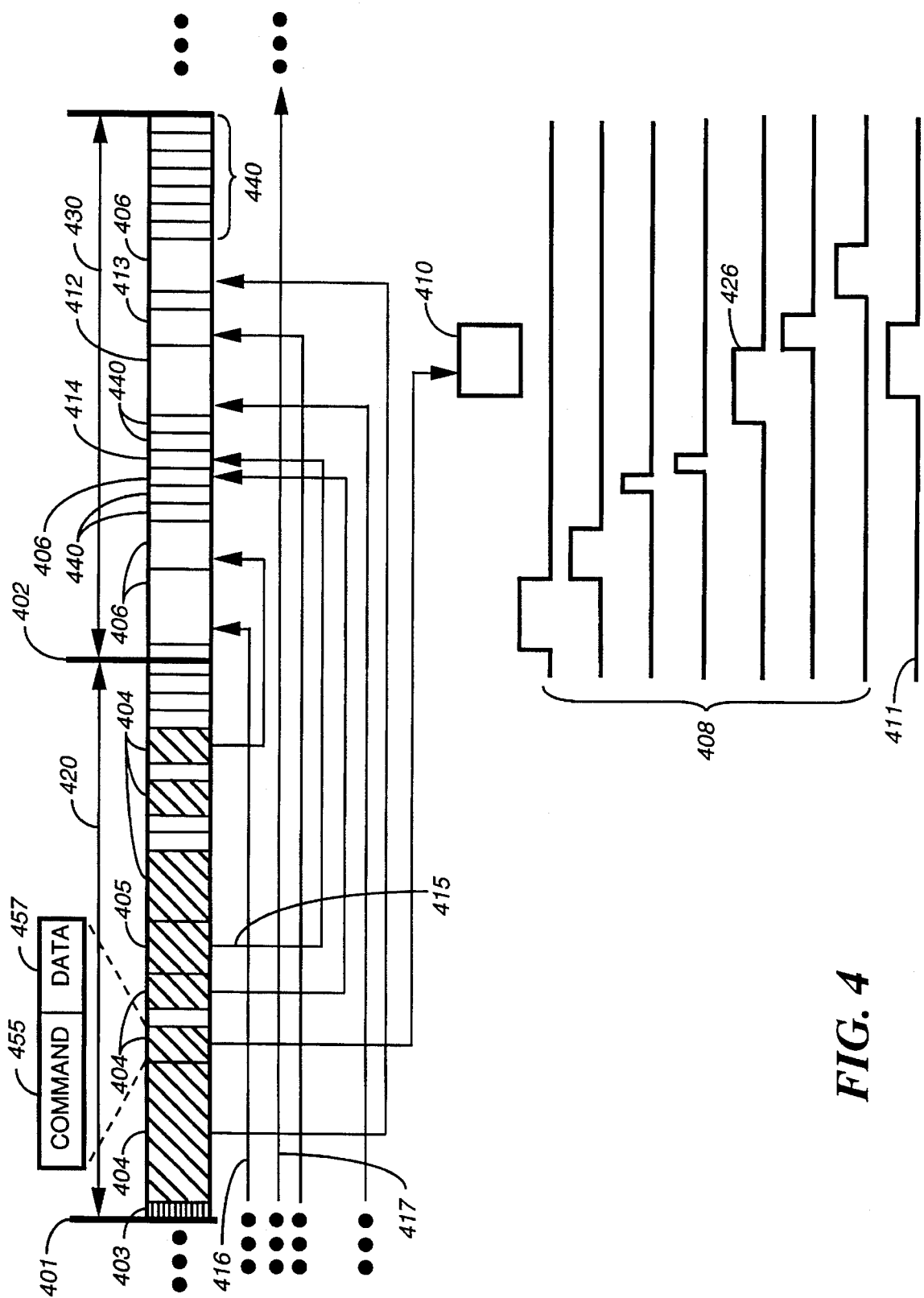
FIG. 4 is a timing diagram of forward and reverse channel radio signals for a first type of the radio communication system, in accordance with the preferred embodiment of the present invention.

Referring to FIG. 4, a timing diagram 400 shows forward and reverse channel radio signals for the first type of radio communication system, in accordance with the preferred embodiment of the present invention. The forward channel radio signal, which is transmitted during a forward channel frame 420, and the reverse channel radio signals, which are transmitted during a reverse channel frame 430, are at a first radio carrier frequency.

The forward channel frame 420 duration is from a forward channel frame boundary 401 to a reverse channel frame boundary 402 during which transmissions of a forward channel radio signal are made from the transmitter/receiver 103 to one or more of the identified selective call transceivers in the first type of radio communication system 100. The forward channel radio signal comprises one or more sequential radio signals transmitted from the transmitter/receiver 103. A forward channel frame synchronization word 403 and a plurality of forward channel messages 404, 405 are transmitted within the forward channel radio signal by the transmitter/receiver 103. The reverse channel frame 430 duration is from the reverse channel frame boundary 402 to the next forward channel frame boundary 401 and includes a plurality of the slot times. A plurality of scheduled responses 406, 410, 412, 413, 414 are transmitted as data units, each data unit extending over one or more slot times. For example, scheduled response 410 is four slot times, scheduled response 412 is five slot times, and scheduled response 413 is two slot times. Each of the plurality of scheduled responses 406, 410, 412, 413, 414 is a radio signal transmitted from one of the identified selective call transceivers in response to a command 455 which is completed in one of the forward channel messages 404, 405. Scheduled response 410 is transmitted by one of the selective call transceivers simultaneously with portions of scheduled responses 412 and 413, which are transmitted by other selective call transceivers. Scheduled response 410 is an example of a scheduled response which overlaps, in time, other scheduled responses 412, 413. A scheduled response overlap condition will occur, for example, when the system controller 102 schedules different selective call transceivers to transmit scheduled responses, of which at least some parts are expected to be received at the same time by different geographically separated base receivers. From information received in the command 455, the response timer 215 in the fixed system receiver 107 generates response periods 408, 411, which are described more fully below.

Each frame synchronization word 403 contains a frame sync pattern that marks the forward channel frame boundary 401 as well as information describing the time offset to the reverse channel frame boundary 402, as a number of slot times. The start time of each forward channel message 404 is defined relative to the forward channel frame boundary 401, for example, by a number of slot times. A command 455 is included in one or more of the forward channel messages 404, identifying one of the selective call transceivers by a selective call address of the identified selective call transceiver, as well as a scheduled response time at which the identified selective call transceiver transmits a scheduled response in a reverse channel radio signal, the scheduled response comprising a data unit. The command 455 includes a designated length of the data unit. The forward channel messages 404 also may include data 457, such as a alphanumeric information message. The start time of each scheduled response 406, 410, 412, 413, 414 is defined relative to the reverse channel frame boundary 402.

Synchronization and timing information required by the selective call transceivers in the radio communication system 100 for both receiving on the forward channel frame and transmitting on the reverse channel frame is determined from the forward channel frame synchronization word 403 and the forward channel messages 404. When a selective call transceiver receives the forward channel radio signal, the selective call transceiver processes the forward channel message 404 included in the forward channel radio signal when the forward channel message 404 includes the selective call address of the selective call transceiver, thus identifying the selective call transceiver for processing the forward channel message 404. When a command 455 is received within the forward channel message 404, or in a plurality of forward channel messages, processed by the identified selective call transceiver, the identified selective call transceiver then transmits one of the scheduled responses 406, 410, 412, 413, 414 with the designated data unit length and at the scheduled response time commanded by the system controller 102 in the command 455. Correspondence between the commands 455 received by identified selective call transceivers in the forward channel messages 404 and the scheduled responses 406, 410, 412, 413, 414 from the identified selective call transceivers is indicated in FIG. 4 by arrowed lines from forward channel messages 404, 405 to the scheduled responses 406, 410, 412, 413, 414, of which an example is line 415, which connects from a command 455 completed in forward message 405 to scheduled response 414. Another example is line 416, which connects from a command 455, not shown in FIG. 4, that is completed in an earlier forward channel frame than the forward channel frame 420 shown in FIG. 4, to one of the scheduled response 406 in FIG. 4. Another example is line 417 which indicates connection from a command 455, not shown in FIG. 4, that is completed in an earlier forward channel frame than the forward channel frame 420 shown in FIG. 4, to a scheduled response that is in a later reverse channel frame than those shown in FIG. 4.

Each scheduled response 406, 410, 412, 413, 414 transmitted from an identified selective call transceiver is completely self contained in that it includes all of the information required by the fixed system receiver 107 to detect and decode the scheduled response 406, 410, 412, 413, 414. That is, the scheduled response 406, 410, 412, 413, 414 each include a synchronization pattern for detection of the data unit, the identified selective call transceiver's unique address, and information conveying the transmitted data unit length.

The combined receiver 205 of the fixed system receiver 107 receives the commands 455 in the forward channel radio signal and couples to the response timer 215 the scheduled response times at which each of the data units of the scheduled responses 406, 410, 412, 413, 414 are transmitted, as well as the designated lengths of each of the data units. The response timer 215 generates the control signal which comprises the plurality of response periods 408, 411. For example, the response periods 408 correspond to the non-overlapping scheduled responses 406, 412, 413, 414 shown directly above the response periods 408 in FIG. 4. The response period 411 corresponds to the scheduled response 410, which overlaps two response periods 412, 413. The combined receiver 405 is enabled during the reverse channel frame during all the response periods 408, 411. The combined receiver 205 is disabled during portions of the reverse channel frame 430 when there are non response periods 440. The combined receiver 205 is also enabled during the forward channel frame 420 by a forward channel enable signal (not shown in FIG. 1–8). The fixed system receiver 107 provides improved performance of the communication system 100 by preventing the fixed system receiver 107 from falsely decoding noise when data units are non-existent during the reverse channel frame 430, when there are non response periods 440. Furthermore, during the reverse channel frame 430 when there are non response periods 440, processor cycles are not used for processing data units during slot times 440 which do not contain valid selective call transceiver data unit transmissions, which reduces delays in completing other functions being processed in the fixed receiver 107.

In the preferred embodiment of the present invention, the combined receiver 205 of the fixed system receiver 107 receives the commands 455 in the forward channel radio signal and couples the identified selective call addresses of the scheduled responses 406, 410, 412, 413, 414, the scheduled response times at which the data units of the scheduled responses 406, 410, 412, 413, 414 are transmitted, as well as the designated lengths of the data units to the routing controller 220. When the combined receiver 205 is enabled during response periods by the control signal, reverse radio signals transmitted by identified selective call transceivers can be received by the combined receiver 205, and received data units can be decoded. When received data units include an address which matches an identified selective call address of one of the scheduled responses 406, 410, 412, 413, 414 which is scheduled at the time the data unit is received, and when the data units include the designated length of one of the scheduled responses 406, 410, 412, 413, 414, the data unit is forwarded to the system controller 102. When the address or designated length of the received data units do not match the corresponding address or designated length in the command 455, processing of the data units is stopped by the routing controller 220. Thus, data units received during the response periods 408, 411 are checked by the routing controller 220 for correctness against information received from the commands 455, further reducing a possibility of falsing, which, as described above, exists even when error correction and detection is included in the data units.

Furthermore, by stopping the processing when an incorrect address or length is determined, the routing controller 220 can immediately start processing a new data unit which starts during, but prior to the end of, the data unit for which processing is stopped. For example, without the receiver disabling function which is provided by the control signal, decoding can be started on a noise signal when no data unit is being received. The decoding will prevent the decoding of an actual data unit starting one or more slot times after the noise signal. As another example, when the data unit of scheduled response 412 is received in a weak reverse radio channel signal during response period 426 and a stronger reverse radio signal captures the combined receiver during response period 411 of the scheduled response 410, the routing controller can stop processing the data unit of scheduled response 412 as soon as the routing controller 220 determines that the data unit is foreshortened, allowing the processing of the data unit received during the response period 411. The throughput of the fixed receiver 107 is improved when compared to a fixed receiver which does not use the information in the commands 455 in the forward channel frame in accordance with the preferred embodiment of the present invention.

It will be appreciated that the receiver disablement function provided by the control signal generated by the response timer 215 will provide part of the reduced falsing described above when used without the data unit test functions provided by the routing controller 220, and that the routing controller 220, when testing the data units for either the correct selective call transceiver addressing without the correct designated length of the data unit, or for the correct designated length of the data unit without the correct selective call transceiver addressing, will provide part of the reduced falsing and improved throughput as described above when used without the receiver disablement function. The fixed receiver 107 in accordance with the first alternative embodiment of the present invention provides all the functions required when the testing of the data units is not used as a criteria for forwarding data units to the system controller 102.

Figure 5:
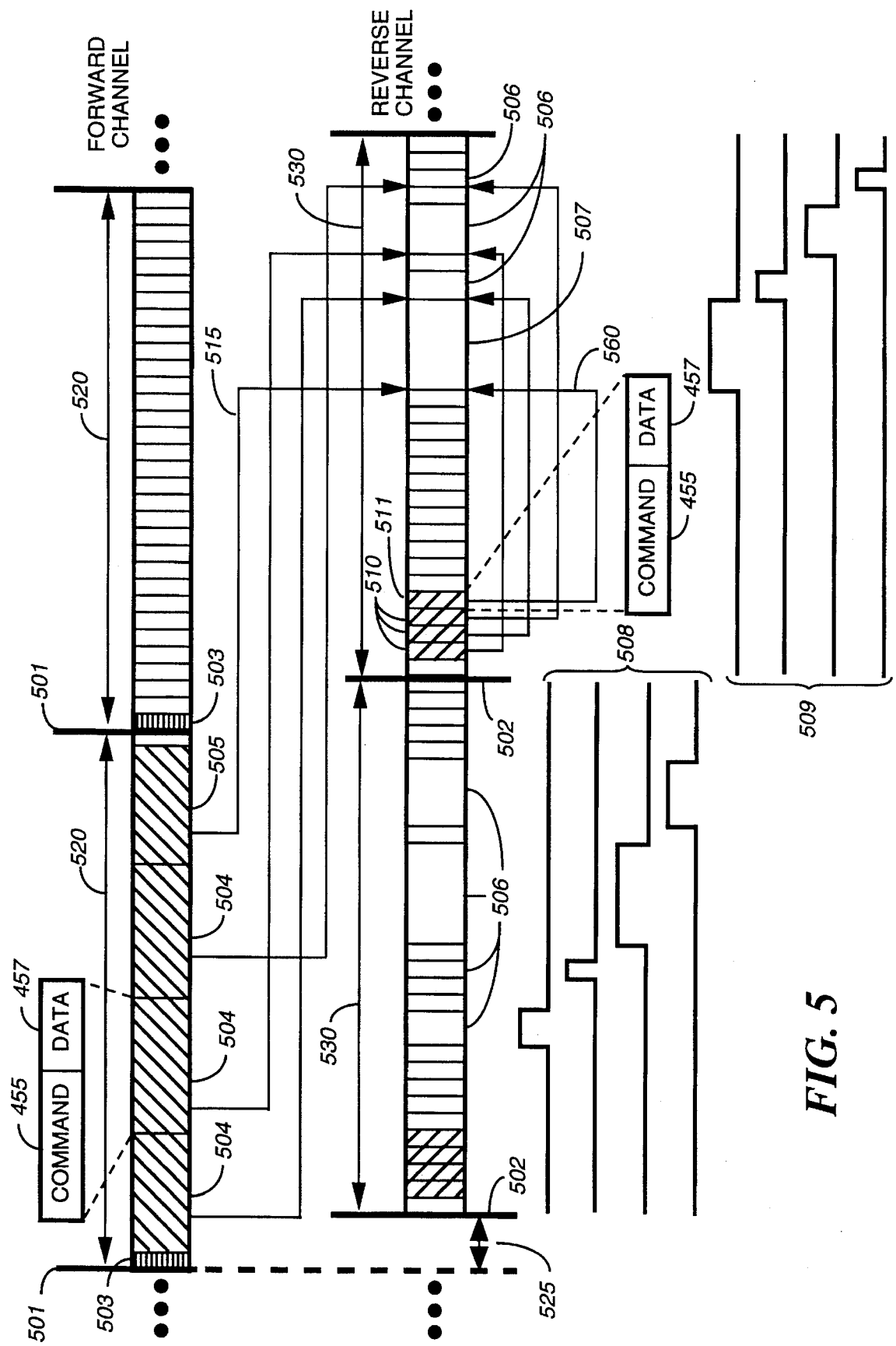
FIG. 5 is a timing diagram of forward and reverse channel radio signals for a second type of the radio communication system, in accordance with the preferred embodiment of the present invention.

Referring to FIG. 5, a timing diagram shows forward and reverse channel radio signals for the second type of radio communication system, in accordance with the preferred embodiment of the present invention. The forward channel radio signal, which is transmitted during a forward channel frame 520, is at the first radio carrier frequency. The reverse channel radio signals, which are transmitted during a reverse channel frame 530, are at a second radio carrier frequency.

The forward channel frame 520 duration is from a forward channel frame boundary 501 to the next forward channel frame boundary 501 and includes a plurality of synchronous transmission slot times having equal duration which are used for transmission of a forward channel radio signal from the transmitter/receiver 103 to one or more of the identified selective call transceivers in the second type of radio communication system 100. The forward channel radio signal comprises one or more sequential radio signals transmitted from the transmitter/receiver 103. A forward channel frame synchronization word 503 and a plurality of forward channel messages 504, 505 are transmitted within the forward channel radio signal by the transmitter/receiver 103. The reverse channel frame 530 duration is from a reverse channel frame boundary 502 to a next reverse channel frame boundary 502 and includes a plurality of slot times. A plurality of scheduled responses 506, 507 are transmitted as data units, each data unit extending over one or more slot times. Each of the plurality of scheduled responses 506, 507 is a radio signal transmitted from one of the identified selective call transceivers in response to one of the forward channel messages 504, 505. As described above for the first type of radio communication system 100 (but not shown in FIG. 5), a scheduled response can be transmitted by one of the selective call transceivers simultaneously with portions of other scheduled responses which are transmitted by other selective call transceivers. The response timer 215 in the fixed system receiver 107 generates response periods 508, 509, which are described more fully below.

Each frame synchronization word 503 contains a frame sync pattern that marks the forward channel frame boundary 501 as well as information describing the time offset 525 to the reverse channel boundary 502, for example as a number of slot times, varying from 0 to a value which may exceed the length of the forward channel frame. The forward channel messages 504, 505 include one or more commands 455, each command 455 identifying one of the selective call transceivers and including the information described above for the first type of radio communication system 100. The start time of each scheduled response 506, 507 is defined relative to the reverse channel frame boundary 502.

In the second type of radio communication system 100, the commands 455 included in the forward channel messages 504, 505 are also transmitted by the transmitter/receivers 103 at the second radio carrier frequency, during a portion of a reverse channel frame 530, in commands 455, which are included in reverse channel messages 510, 511. Synchronization and timing information required by the selective call transceivers in the radio communication system 100 for both receiving on the forward channel frame and transmitting on the reverse channel frame is determined from the forward channel frame synchronization word 503 and the forward channel messages 504. The operation of the selective call transceivers is the same in as in the first type of radio communication system 100. Correspondence between the command 455 received by identified selective call transceivers in the forward channel messages 504, 505 and the scheduled responses 506, 507 from the identified selective call transceivers is indicated in FIG. 5 by arrowed lines from forward channel messages 504, 505 to the scheduled responses 506, 507, of which an example is line 515, which connects from a command 455 completed in the forward channel message 505 to the scheduled response 507. Correspondence between the command 455 received by the combined receiver 205 in the reverse channel messages 510, 511 and the scheduled responses 506, 507 from the identified selective call transceivers is indicated in FIG. 5 by arrowed lines from the reverse channel messages 510, 511 to the scheduled responses 506, 507, of which an example is line 560, which connects from a command 455 received in reverse channel message 511 to scheduled response 507. In a manner similar to the example given in FIG. 4 for the first type of radio communication system 100, but not shown in FIG. 5, command 455 can be generated to schedule responses in reverse channel frames occurring after the next forward channel frame from the one in which the command 455 is generated.

It will be appreciated that the commands 455 transmitted in the reverse channel messages 510, 511 can be transmitted, as shown in FIG. 5, at a time later than the commands 455 transmitted in the forward channel messages 504, 505, or they may be transmitted simultaneously, such as by coupling a modulating signal including the commands 455 to two modulation inputs of a radio transmitter/receiver 103 capable of transmitting at the first and second radio carrier frequencies simultaneously.

It will be further appreciated that the commands 455 included in the reverse channel messages 510, 511 may not be necessarily duplicated in the forward channel messages 504, 505 in the second type of radio communication system 100. The commands 455 included in the reverse channel messages 510, 511 must include the scheduled response time and at least one of the selective call address and the designated length of the data unit, for each scheduled response, but the forward channel messages 504, 505 may eliminate one or more of the scheduled response time, the selective call address or the designated length of the data unit. For example, the designated data unit length may not be included in the forward channel messages 504, 505 for use by the selective call transceivers in some radio communication systems 100 of the second type that will otherwise benefit from the preferred or first alternative embodiments of the present invention.

In the same manner as for the radio communication system of the first type, each scheduled response 506 transmitted from an identified selective call transceiver is completely self contained. The operation of the fixed system receiver 107 in accordance with the preferred and first alternative embodiments of the present invention, when operating in the second type of radio communication system 100, as described above with respect to FIG. 5, is different from the operation of the fixed system receiver 107 in accordance with the preferred and first alternative embodiments of the present invention, when operating in the first type of radio communication system 100, as described above with respect to FIG. 4, only in that the commands are not necessarily received at the same time with respect to the forward channel frame boundaries 401, 501. In all other respects, the operation of the fixed system receiver 107, as described above with respect to FIG. 5, is identical to the operation of the fixed system receiver 107, described above with respect to FIG. 4, and the improvements provided thereby are therefore the same.

Figure 6:
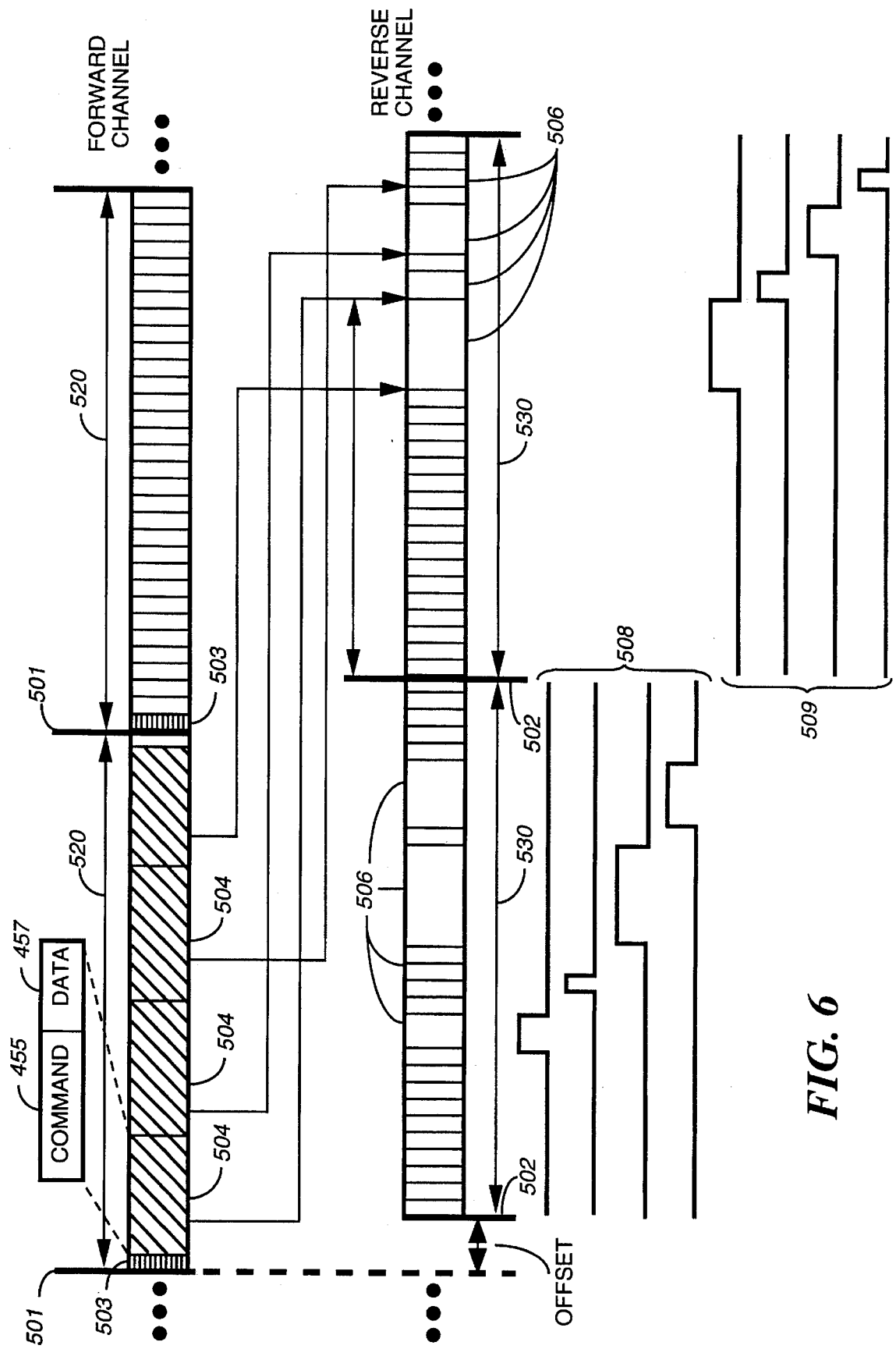
FIG. 6 is a timing diagram of forward and reverse channel radio signals for a third type of the radio communication system, in accordance with the second alternative embodiment of the present invention.

Referring to FIG. 6, a timing diagram shows forward and reverse channel radio signals for the third type of radio communication system, in accordance with the second and third alternative embodiments of the present invention. The forward channel radio signal, which is transmitted during a forward channel frame 520, is at the first radio carrier frequency. The reverse channel radio signals, which are transmitted during a reverse channel frame 530, are at a second radio carrier frequency. The synchronization 403, timing, messages 404, and commands 455 transmitted from the transmitter/receivers 103 and the operation of the transmitter/receivers 103 is identical in the second and third types of radio communication systems 100 except that the commands 455 are not repeated at the second radio carrier frequency by the transmitter/receivers 103.

The operation of the selective call transceivers is the same as in the first type of radio communication system 100.

In the same manner as for the radio communication system 100 of the first and second types, each scheduled response 506 transmitted from an identified selective call transceiver is completely self contained. The fixed system receiver 107 in accordance with the second and third alternative embodiments of the present invention is different from the fixed system receiver 107 described above with respect to FIG. 4 in that the commands are received in the forward channel messages 504, 505 by the forward receiver 305 at the first frequency, instead of in the reverse channel messages 510, 511 (FIG. 5) by the combined receiver 205 at the second carrier frequency. The scheduled responses 506 are received at the second carrier frequency by the reverse receiver 310 in the second and third alternative embodiments of the present invention, and by the combined receiver 205 in the first and second embodiments of the present invention. The generation of the control signal from the information in the commands by the response timer 215 and by the routing controller 220 is identical in the second and third alternative embodiments of the present invention, respectively, as in the preferred and first alternative embodiments of the present invention, and the improvements provided thereby are therefore respectively the same.

Figure 7:
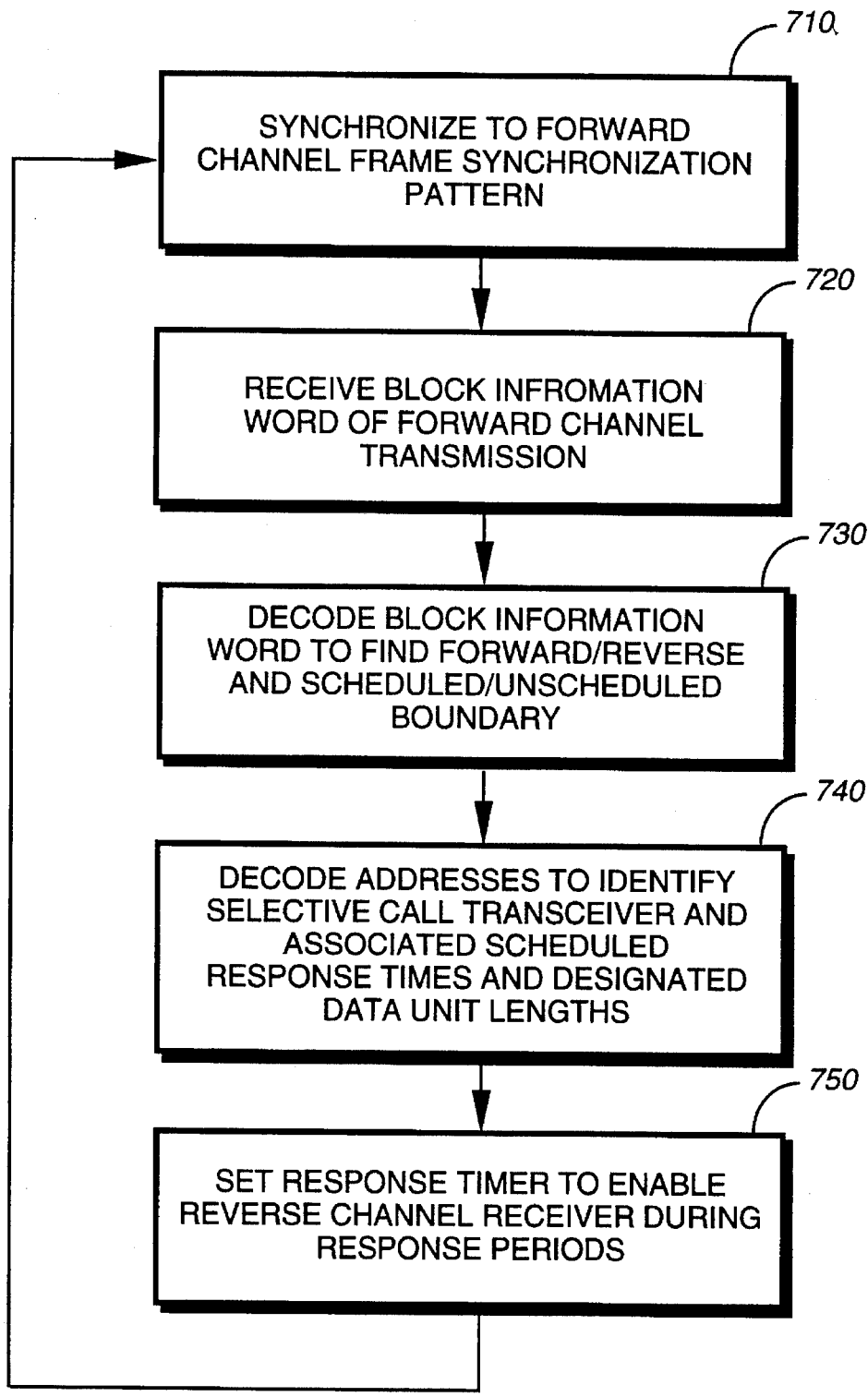
FIG. 7 is a flow chart for generating the control signal which enables reception of the reverse channel radio signal, in accordance with the preferred embodiment of the present invention.

FIG. 7 shows a flow chart which illustrates a method used in the fixed system receiver 107 for decoding commands received in the forward channel radio signal and generating from the commands the control signal which enables the fixed system receiver 107 (FIG. 1) during the response periods 408, 411 (FIG. 4), in accordance with the preferred and first alternative embodiment of the present invention when used in the first type of radio communication system 100.

At step 710, the combined receiver 205 (FIG. 2) receives a forward channel radio signal, and achieves synchronization using the forward channel frame synchronization word 403 at the forward channel frame boundary 401 of each forward channel frame 420. After bit synchronization is achieved the combined receiver 205 (FIG. 2) receives and demodulates block information words present in the messages 404 transmitted in the forward channel radio signal, at step 720. The block information words are decoded by the combined receiver 205 (FIG. 2) to find the reverse channel frame boundary 402 for the first type of radio communication system 100, at step 730. A scheduled/unscheduled reverse channel transmission boundary present in the reverse channel radio signaling (not shown in FIGS. 1–8), determined by the system controller 102 (FIG. 1), is also decoded at step 730. It will be appreciated that the block information words could alternatively be a portion of the forward channel frame synchronization word 403. At step 740, the combined receiver 205 (FIG. 2) decodes the commands included in the forward channel radio signal, which commands include addresses of the identified selective call transceivers and scheduled response times at which each of the identified selective call transceivers will transmit the reverse channel radio signal comprising a data unit, and which commands include the designated lengths of the data unit.

At step 750, the combined receiver 205 (FIG. 2) sets the response timer 215 (FIG. 2) to enable the combined receiver 205 (FIG. 2) for response periods beginning substantially at the scheduled response times and having durations which are substantially the designated lengths of the data units included in the reverse channel transmissions.

It will be appreciated that the method used in the fixed receiver 107 in accordance with the preferred and first alternative embodiments of the present invention, when used in the second type of radio communication system 100, is identical to the method described above which is used in the preferred embodiment of the present invention with the first type of radio communication system 100, except that the forward channel radio signal is received by the combined receiver 205 during the reverse channel frame 430.

It will be appreciated that method used in the fixed receiver 107 in accordance with the second and third alternative embodiments of the present invention, when used in the third type of radio communication system 100, is identical to the method described above which is used in the preferred embodiment of the present invention, except that the forward channel radio signal is received by the forward receiver 305 at the first radio carrier frequency and the reverse channel radio signal is received by the reverse receiver 310 at the second radio carrier frequency, and the control signal disables the reverse receiver 310.

Figure 8:
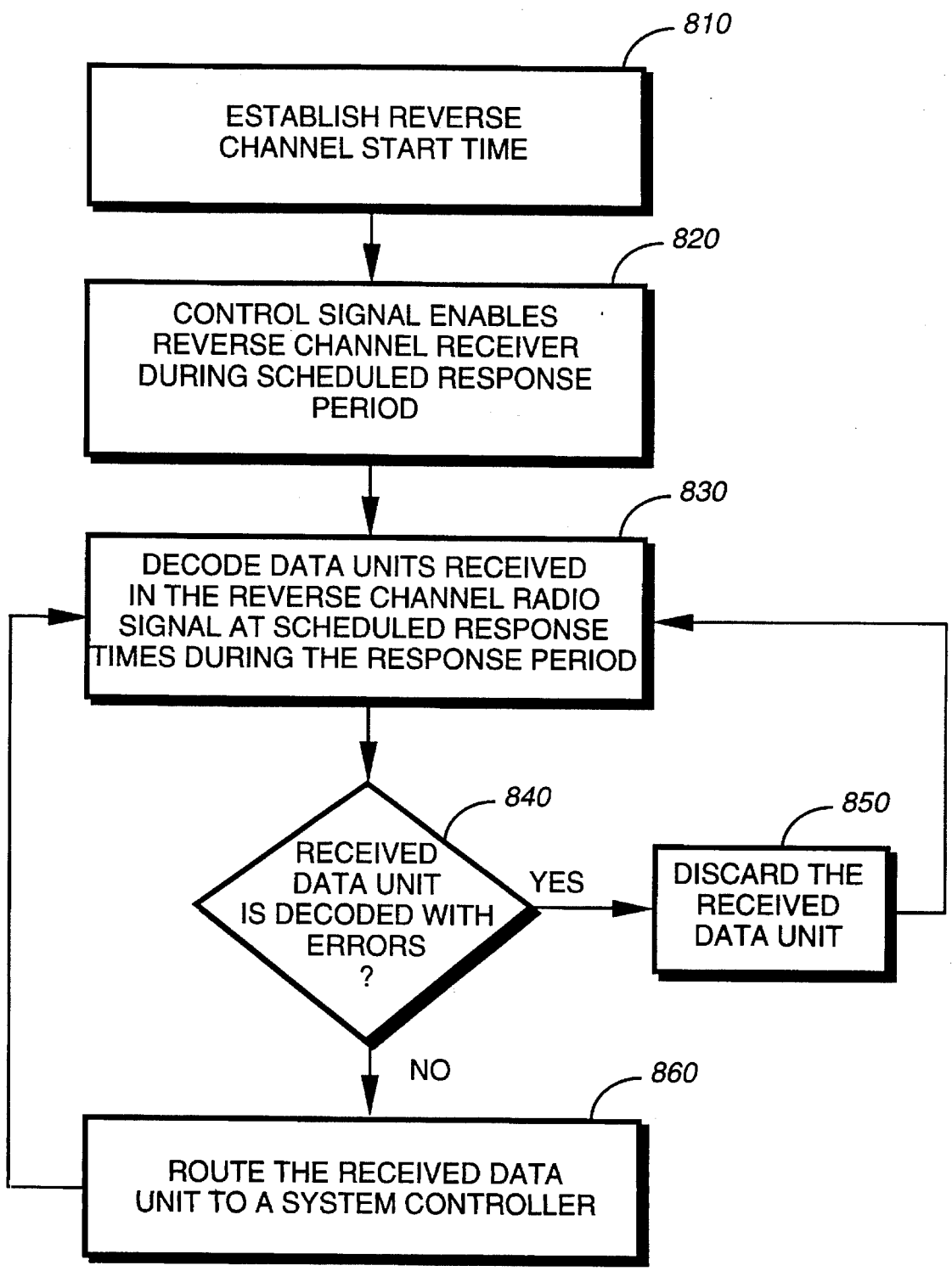
FIG. 8 is a flow chart for testing and routing received data units, in accordance with the preferred embodiment of the present invention.

FIG. 8 shows a flow chart which illustrates a method used in the fixed system receiver 107 for decoding reverse channel data units received in the reverse channel radio signal, in accordance with the preferred embodiment of the present invention, when used in the first and second type of radio communication systems 100.

At step 810, the reverse channel frame boundary 402 for the reverse channel frame 430 is established. The control signal coupled from the response timer 215 enables reception by the combined receiver 205 of the reverse channel radio signal during a scheduled response period, at step 820.

At step 830 a data unit transmitted by a selective call transceiver in the reverse channel radio signal during a response period is decoded by the combined receiver 205. The data unit is coupled to the routing controller 220 where error detection and correction algorithms, and additional tests, are applied to the decoded data units, at step 840. The additional tests include determining whether the received data unit includes the address of the selective call transceiver scheduled to respond during the response period and whether the received data unit has the designated length of the data unit. When data units are decoded error free and the received data unit includes the address of the selective call transceiver and the received data unit has the designated length of the data unit, the data units are coupled to the telephone interface 225, wherein the data unit is used to modulate signals, such as modem signals, which are transmitted to the system controller 102, at step 860. When a data unit is decoded with errors, or the received data unit does not include the address of the selective call transceiver scheduled to respond during the response period, or the received data unit does not have the designated length of the data unit, at step 850, no further processing of the data unit is done. When the processing of the data unit is completes at step 850 or at step 860, the combined receiver 205 decodes a next data unit received by the combined receiver 205 at a next response period, when enabled by the response timer 215.

It will be appreciated that method used in the fixed receiver 107 in accordance with the second alternative embodiment of the present invention, when used in the third type of radio communication system 100, is identical to the method described above which is used in the preferred embodiment of the present invention, except that the reverse channel radio signal is received by the reverse receiver 310 at the second radio carrier frequency, and the control signal disables the reverse receiver 310.

Figure 9:
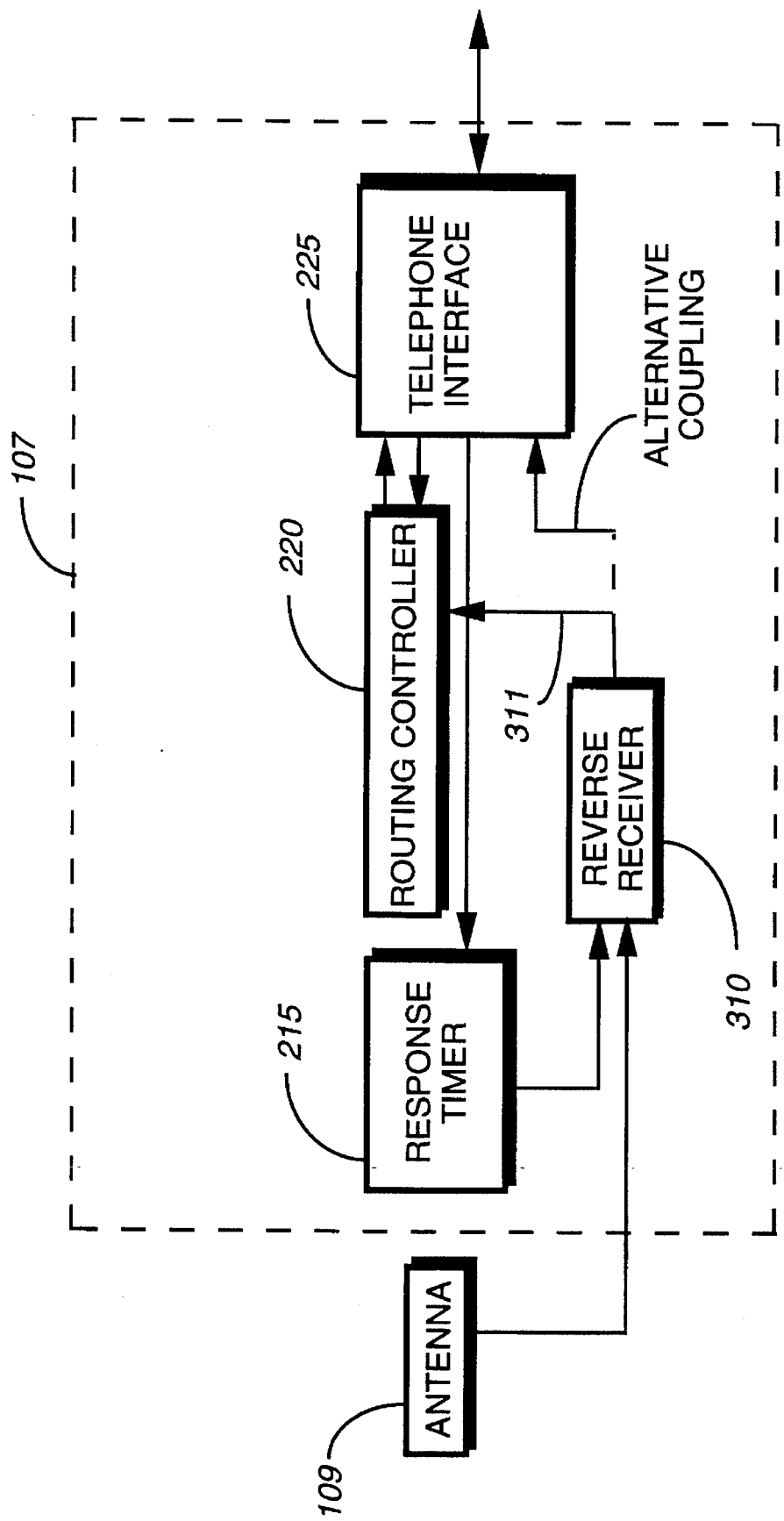
FIG. 9 is an electrical block diagram of a fixed system receiver in accordance with a fourth alternative embodiment of the present invention.

Referring to FIG. 9, an electrical block diagram of a fixed system receiver is shown, in accordance with a fourth alternative embodiment of the present invention used in a first, second, or third type of radio communication system 100. The fixed system receiver 107 of FIG. 9 differs from the fixed system receiver 107 of FIG. 2 in that the forward receiver 305 has been eliminated and the functions performed therein are performed instead by the telephone interface 225. The system controller 102 transmits the same commands that are included in the forward radio channel, which are transmitted to the selective call transceivers for scheduling the scheduled responses, to the fixed system receiver 107 via the private network or PSTN 108. The commands are sent in encoded digital signals which are used to modulate an analog signal, such as a modem signal. The command 455 sent via the private network or PSTN 108 are not necessarily sent simultaneously with the commands transmitted in the forward channel radio signal. The telephone interface 225 is coupled to the private network or PSTN 108 for receiving the commands within the modulated digital signals from the system controller 102, in addition to sending the decoded and tested data units received as scheduled responses from the selective call transceivers to the system controller 102. The telephone interface 225 is further coupled to the response timer 220 and the routing controller 220. The telephone interface 205 receives, demodulates and decodes the commands included in the forward channel radio signal. From information included in the commands, the response timer 215 generates the control signal, which enables and disables the reverse channel receiver 205 during the reverse channel time. When the reverse receiver 205 is enabled by the control signal, the reverse receiver 205 receives and demodulates radio signals which contain scheduled responses transmitted by the selective call transceivers.

In the fourth alternative embodiment of the present invention, the scheduled responses are coupled to the routing controller 220, wherein the tests, which are described above, are performed on the scheduled responses. When tests results are successful, the scheduled responses are coupled to the telephone interface 225, wherein the scheduled responses are used to modulate signals, such as modem signals, which are transmitted to the system controller 102. When the tests are not successful, the scheduled responses which fail the tests are processed no further. In a fifth alternative embodiment of the present invention, in which there is no routing controller 220, the scheduled responses are not tested, and are coupled directly to the telephone interface 225.

It will be appreciated that the use of the telephone interface 225 for receiving the commands could alternatively be used in conjunction with the preferred, first, second, or third alternative embodiments of the present invention, thereby providing an alternative link when one or the other of the forward channel radio signal or the telephone link are unreliable, either due to weak signals or timing problems.

It will be appreciated that any of the preferred and alternate embodiments of the present invention described herein may be more appropriate depending upon the type of radio communication system 100 (first, second or third types as described above), the sophistication of the error detecting and correcting codes used in the reverse channel scheduled responses, and the processing capability of the fixed receiver 107.

By now it should be appreciated that there has been provided a method and apparatus which reduces the probability of falsely decoding scheduled responses from selective call transceivers and which increases the probability of properly decoding responses from selective call transceivers, thereby increasing scheduled response throughput in a radio communication system.

We claim:

1. A method used in a fixed system receiver for improving response reception in a radio communication system having a forward radio channel and a reverse radio channel, wherein a command is transmitted in a forward channel radio signal by a fixed transmitter to a selective call transceiver, and wherein the method comprises the steps of:

receiving, demodulating, and decoding the command within a forward receiver, which command also includes an address of the selective call transceiver and a scheduled response time at which the selective call transceiver transmits a reverse channel radio signal comprising a data unit, and which command includes a designated length of the data unit;

determining a response period beginning substantially at the scheduled response time and having a duration which is substantially the designated length of the data unit; and receiving and demodulating the reverse channel radio signal within a reverse receiver during the response period.

2. The method according to claim 1, further comprising the step of disabling reception within the reverse receiver during periods which are not the response period.

3. The method according to claim 1, wherein a plurality of commands are transmitted in the forward channel radio signal by the fixed transmitter to one or more selective call transceivers, wherein said step of receiving, demodulating, and decoding is repeated for each of the plurality of commands, the method further comprising the steps of:

determining one or more response periods, each corresponding to one of the plurality of commands, each response period beginning substantially at the scheduled response time included in the one of the plurality of commands, and having a duration which is substantially the designated length of the data unit included in the one of the plurality of commands; and receiving and demodulating reverse channel radio signals within the reverse receiver during the one or more response periods.

4. The method according to claim 3, further comprising the step of disabling reception within the reverse receiver during periods which are not the one or more response periods.

5. The method according to claim 1, further comprising the steps of:

decoding a received data unit at the scheduled response time; and routing the received data unit to a system controller when the received data unit has the designated length of the data unit, and otherwise terminating processing of the received data unit.

6. The method according to claim 1, further comprising the steps of:

decoding a received data unit at the scheduled response time; and routing the received data unit to a system controller when the received data unit has the address of the selective call transceiver, and otherwise terminating processing of the received data unit.

7. A fixed system receiver for use in a radio communication system having a forward radio channel and a reverse radio channel, wherein a command is transmitted in a forward channel radio signal from a system controller by a fixed transmitter to a selective call transceiver, and wherein the fixed system receiver comprises:

a forward receiver for receiving, demodulating, and decoding the command, which command includes an address of the selective call transceiver and a scheduled response time at which the selective call transceiver transmits a reverse channel radio signal comprising a data unit, and which command includes a designated length of the data unit;

a reverse receiver for receiving and demodulating the reverse channel radio signal; and a response timer, coupled to said forward receiver and said reverse receiver, said response timer for determining a response period beginning substantially at the scheduled response time and having a duration which is substantially the designated length of the data unit, and for generating a control signal which enables said reverse receiver during the response period.

8. The fixed system receiver according to claim 7, wherein said response timer disables said reverse receiver at times which are not the response period.

9. The fixed system receiver according to claim 7, wherein a plurality of commands are transmitted in the forward channel radio signal by the fixed transmitter to one or more selective call transceivers, and wherein each command includes an address of one of the one or more selective call transceivers, a scheduled response time at which the one of the one or more selective call transceivers transmits a reverse channel radio signal comprising a data unit, and a designated length of the data unit, and wherein said forward receiver receives, demodulates, and decodes one or more of the plurality of commands, and wherein said response timer determines one or more response periods corresponding to one of the one or more of the plurality of commands, each response period beginning substantially at the scheduled response time and having a duration which is substantially the designated length of the data unit, and wherein said response timer generates a control signal which enables said reverse receiver during the one or more response periods, and disables said reverse receiver during times which are not the one or more response periods.

10. The fixed system receiver according to claim 7 wherein the forward channel radio signal and reverse channel radio signal are at a first radio carrier frequency.

11. The fixed system receiver according to claim 10 wherein said forward receiver and said reverse receiver are a combined receiver.

12. The fixed system receiver according to claim 7 wherein the forward channel radio signal is at a first radio carrier frequency and the reverse channel radio signal is at a second radio carrier frequency.

13. The fixed system receiver according to claim 12 wherein the command is transmitted by the radio communication system at the second radio carrier frequency.

14. The fixed system receiver according to claim 13, wherein said forward receiver and said reverse receiver are a combined receiver.

15. The fixed system receiver according to claim 7, wherein the forward receiver is a telephone interface, and wherein the command is transmitted from the system controller over a telephone network in an digital signal to the fixed system receiver.

16. The fixed system receiver according to claim 7, further comprising a controller, coupled to said forward receiver and said reverse receiver, said controller for decoding a received data unit from the demodulated reverse channel radio signal received at the scheduled response time.

17. The fixed system receiver according to claim 16, wherein said controller routes the received data unit to the system controller when the received data unit has the designated length of the data unit, and otherwise terminates processing of the received data unit.

18. The fixed system receiver according to claim 16, wherein said controller routes the received data unit to the system controller when the received data unit includes a transceiver address which matches the address of the selective call transceiver, and otherwise terminates processing of the received data unit.

19. The fixed system receiver according to claim 7 wherein the forward radio channel has a plurality of forward channel frame boundaries and wherein the scheduled response time is relative to one of the plurality of forward channel frame boundaries.

20. The fixed system receiver according to claim 19 wherein a reverse channel frame boundary, which is relative to one of the plurality of forward channel frame boundaries, is included in the command, and wherein the scheduled response time is relative to the reverse channel frame boundary.

21. A fixed system receiver for use in a radio communication system having a forward radio channel and a reverse radio channel, wherein a command is transmitted in a forward channel radio signal by a fixed transmitter to a selective call transceiver, and wherein the fixed system receiver comprises:

a combined receiver for receiving, demodulating, and decoding the command included in the forward channel radio signal having a first radio carrier frequency, which command includes an address of the selective call transceiver and a scheduled response time at which the selective call transceiver transmits a reverse channel radio signal having the first radio carrier frequency, said reverse channel radio signal comprising a data unit, and which command includes a designated length of the data unit, said combined receiver also for receiving and demodulating the reverse channel radio signal;

a response timer, coupled to said combined receiver, said response timer for determining a response period beginning substantially at the scheduled response time and having a duration which is substantially the designated length of the data unit, and for generating a control signal which enables said combined receiver during the response period and disables said combined receiver at times which are not the response period; and a controller, coupled to said combined receiver, said controller for decoding a received data unit from the demodulated reverse channel radio signal received at the scheduled response time, for routing the received data unit to a system controller when the received data unit has the designated length of the data unit and when the received data unit includes a transceiver address which matches the address of the selective call transceiver, and otherwise terminating processing of the received data unit, and wherein the forward radio channel has a plurality of forward channel frame boundaries and wherein a reverse channel frame boundary, which is relative to one of the plurality of forward channel frame boundaries, is included in the command, and wherein the scheduled response time is relative to the reverse channel frame boundary.

\* \* \* \* \*